United States Patent
Brannon

(10) Patent No.: US 10,087,735 B2
(45) Date of Patent: Oct. 2, 2018

(54) APPARATUS AND METHODS FOR PROVIDING INFORMATION ABOUT ONE OR MORE SUBTERRANEAN VARIABLES

(75) Inventor: Harold Dean Brannon, Magnolia, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 955 days.

(21) Appl. No.: 13/030,570

(22) Filed: Feb. 18, 2011

(65) Prior Publication Data

US 2012/0048538 A1    Mar. 1, 2012

Related U.S. Application Data

(60) Provisional application No. 61/306,478, filed on Feb. 20, 2010.

(51) Int. Cl.
| | |
|---|---|
| *E21B 43/267* | (2006.01) |
| *E21B 47/01* | (2012.01) |
| *E21B 49/00* | (2006.01) |
| *G01V 1/40* | (2006.01) |
| *G01V 3/18* | (2006.01) |

(52) U.S. Cl.
CPC ........... *E21B 43/267* (2013.01); *E21B 47/01* (2013.01); *E21B 49/00* (2013.01); *G01V 1/40* (2013.01); *G01V 3/18* (2013.01)

(58) Field of Classification Search
None
See application file for complete search history.

(56) References Cited

U.S. PATENT DOCUMENTS

| | | |
|---|---|---|
| 1,819,923 A | 8/1931 | Schlumberger |
| 1,913,293 A | 6/1933 | Schlumberger |
| 3,012,893 A | 12/1961 | Kremzner et al. |
| 3,985,909 A | 10/1976 | Kirkpatrick |
| 4,289,794 A | 9/1981 | Kleiner et al. |
| 5,603,971 A | 2/1997 | Porzio et al. |
| 5,756,136 A | 5/1998 | Black et al. |
| 5,918,262 A | 6/1999 | Sanford |
| 5,929,437 A | 7/1999 | Elliott et al. |
| 6,023,168 A | 2/2000 | Minerbo |

(Continued)

FOREIGN PATENT DOCUMENTS

| | | |
|---|---|---|
| WO | 84/02838 A1 | 8/1984 |
| WO | 2009/032996 A2 | 3/2009 |

(Continued)

OTHER PUBLICATIONS

Crittenden, et al., MWH's Water Treatment Principles and Design, 2012, John Wiley & Sons, Inc., Third Ed., pp. 645-650.*

(Continued)

*Primary Examiner* — Caroline N Butcher
(74) *Attorney, Agent, or Firm* — John Wilson Jones; Jones Delflache LLP

(57) ABSTRACT

A method of obtaining information about at least one variable existing at a target location in an underground well bore and/or surrounding subterranean formation includes delivering a plurality of signal generating devices to the target location(s), emitting at least one detectable signal from the target location and receiving at least one such signal. Information about the variable(s) is derived from at least some of the received signals.

17 Claims, 6 Drawing Sheets

(56) References Cited

U.S. PATENT DOCUMENTS

| | | | |
|---|---|---|---|
| 6,187,351 B1 | 2/2001 | Porzio et al. | |
| 6,330,914 B1 | 12/2001 | Hocking et al. | |
| 6,371,917 B1 | 4/2002 | Ferrara et al. | |
| 6,562,256 B1 | 5/2003 | Fleming et al. | |
| 6,652,895 B2 | 11/2003 | Porzio et al. | |
| 6,684,159 B2 | 1/2004 | Kahn et al. | |
| 6,840,318 B2 | 1/2005 | Lee | |
| 7,134,492 B2* | 11/2006 | Willberg et al. | 166/250.1 |
| 7,400,262 B2* | 7/2008 | Chemali et al. | 340/854.3 |
| 7,424,911 B2 | 9/2008 | McCarthy et al. | |
| 7,803,740 B2 | 9/2010 | Bicerano | |
| 7,803,741 B2 | 9/2010 | Bicerano | |
| 7,803,742 B2 | 9/2010 | Bicerano | |
| 7,819,181 B2 | 10/2010 | Entov et al. | |
| 7,902,125 B2 | 3/2011 | Bicerano | |
| 8,006,754 B2 | 8/2011 | Bicerano | |
| 8,006,755 B2 | 8/2011 | Bicerano | |
| 8,088,718 B2 | 1/2012 | Bicerano | |
| 8,258,083 B2 | 9/2012 | Bicerano | |
| 8,278,373 B2 | 10/2012 | Bicerano | |
| 2003/0205376 A1* | 11/2003 | Ayoub et al. | 166/254.2 |
| 2004/0040707 A1 | 3/2004 | Dusterhoft et al. | |
| 2004/0176911 A1 | 9/2004 | Bratton et al. | |
| 2005/0272611 A1 | 12/2005 | Lord et al. | |
| 2006/0113077 A1 | 6/2006 | Willberg et al. | |
| 2007/0106006 A1 | 5/2007 | Cooper et al. | |
| 2007/0114028 A1* | 5/2007 | Crabtree et al. | 166/280.1 |
| 2007/0161515 A1 | 7/2007 | Bicerano | |
| 2007/0202318 A1 | 8/2007 | Smith et al. | |
| 2008/0125335 A1 | 5/2008 | Bhavsar | |
| 2008/0208054 A1 | 8/2008 | Azuma et al. | |
| 2008/0236814 A1* | 10/2008 | Roddy | 166/250.01 |
| 2008/0314586 A1 | 12/2008 | Freeman | |
| 2009/0022011 A1* | 1/2009 | Mickael et al. | 367/81 |
| 2009/0157322 A1 | 6/2009 | Levin | |
| 2009/0173492 A1* | 7/2009 | O'Malley | E21B 43/003 166/249 |
| 2009/0179649 A1 | 7/2009 | Schmidt et al. | |
| 2009/0194273 A1* | 8/2009 | Surjaatmadja | E21B 43/26 166/250.1 |
| 2009/0211754 A1 | 8/2009 | Verret et al. | |
| 2009/0250216 A1 | 10/2009 | Bicerano | |
| 2009/0256575 A1 | 10/2009 | Pisklak et al. | |
| 2009/0288820 A1* | 11/2009 | Barron et al. | 166/249 |
| 2010/0038083 A1 | 2/2010 | Bicerano | |
| 2010/0155065 A1* | 6/2010 | Misselbrook | 166/280.1 |
| 2010/0158816 A1 | 6/2010 | Kawabata et al. | |
| 2011/0098202 A1* | 4/2011 | James et al. | 507/225 |
| 2012/0031613 A1 | 2/2012 | Green | |

FOREIGN PATENT DOCUMENTS

| | | |
|---|---|---|
| WO | 2009/047781 A2 | 4/2009 |
| WO | WO-2010/105177 A2 | 9/2010 |

OTHER PUBLICATIONS

Gerhard Von Der Emde et al., "Electric fish measure distance in the dark", Nature, Oct. 29, 1998, vol. 395, pp. 890-894.

James R. Solberg et al., "Robotic Electrolocation: Active Underwater Target Localization with Electric Fields", Proceedings of the 2007 International Conference of Robotics and Automation (ICRA), Apr. 10-14, 2007, Rome, Italy.

James R. Solberg et al., "Active Electrolocation for Underwater Target Localization", The International Journal of Robotics Research, May 2008, vol. 27, No. 5, pp. 529-548.

Mark Halper, Global Business: Norway's Power Push. Is osmosis the answer to the world's energy shortage? Why the "salient gradient" holds promise, TIME, Dec. 13, 2010, pp. Global 1-2, vol. 176.

Brennan, Christopher Earls. "Cavitation and Bubble Dynamics", Oxford University Press 1995, ISBN 0-19-509409-3, http://caltechbook.library.caltech.edu/archive/00000001/bubble.htm, 254 pages.

Nano Resbots: Navigating the Reservoirs of Tomorrow, Saudi Aramco, Mar. 6, 2008, http://www.rigzone.com/news/article.asp?a_id=57957, 2 pages.

* cited by examiner

APPARATUS AND METHODS FOR PROVIDING INFORMATION ABOUT ONE OR MORE SUBTERRANEAN VARIABLES

This application claims priority to U.S. Provisional Patent Application Ser. No. 61/306,478 filed Feb. 20, 2010 and Entitled "Apparatus and Methods for Using Nano-Devices to Provide Information About one or More Subterranean Variables", the disclosure of which is hereby incorporated by reference herein in its entirety.

FIELD OF THE INVENTION

The present disclosure relates generally to providing information about one or more variables in, or proximate to, an underground well or subterranean formation.

BACKGROUND OF THE INVENTION

In various operations conducted via underground wells, it is often advantageous to be able to gain information about one or more variables existing in the well bore or subterranean formation. In the arena of hydrocarbon exploration and production, example operations during which it may be beneficial to gain such information are drilling, cementing, completion, stimulation (including well treatment) and workover. The variables could be any measurable condition, parameter or property, such as one or more geometric dimension, the location of a particular object or geometric feature, temperature, pressure, flow, chemical composition, in-situ stresses in the well bore or formation, or the like. Note, the present disclosure is not limited by the type of operation, the target location in the well bore or formation or the type of variable.

In one example in the hydrocarbon recovery arena, it is often of significant benefit to learn about the geometry of an area within an underground well or subterranean formation, such as the location or dimensions of propped hydraulic fractures. Hydraulic fracturing is a widely used process for stimulating oil and gas wells and which typically involves injecting fluid into the well bore at a higher pressure than the surrounding reservoir pressure. The higher pressure of the injected fluids causes the formation to fracture, exposing the surface area through which oil or gas may flow.

Once a hydraulic fracture is formed, proppant is typically delivered into the fracture during well treatment to effectively increase the conductivity of the fracture and provide a flow path of hydrocarbons between the reservoir and the producing well bore. Proppants ensure the created flow path remains open and conductive after the treating pressure is relieved. Proper placement of the proppant is often considered one of the most critical facets of fracture stimulation. The propped fracture area is believed to directly correlate with stimulated well potential and productivity, whereby the larger the propped fracture, the more productive the well. It is thus typically advantageous to know the location and/or dimensions of propped fractures or proppant packs within conductive fractures. For example, knowledge of the location of proppant in fractures and/or the dimensions of propped fractures can, in some instances, assist in optimizing and improving fracturing efforts and proppant distribution, well placement and production strategies.

Existing techniques for mapping or visualizing underground geometries (e.g. micro-seismic fracture mapping, tilt-meter fracture mapping, use of tracers) are believed to have one or more limitations. For example, some of these techniques provide information on only one dimension or feature (e.g., length, height, depth or azimuth). For another example, some of these techniques only provide information about the formation in close proximity to the well bore. For other examples, some current technologies require the use of one or more offset wells, which may dramatically increase costs, and/or radioactive material, which may be environmentally damaging.

It should be understood that the above-described discussion is provided for illustrative purposes only and is not intended to limit the scope or subject matter of this disclosure, the appended claims or the claims of any related patent application or patent. Thus, none of the appended claims or claims of any related patent application or patent should be limited by the above discussion or required to address, include or exclude the above-cited examples, features and/or disadvantages merely because of their mention above.

Accordingly, there exists a need for improved systems, apparatus and methods capable of providing information about one or more variables in an underground well or subterranean formation having one or more of the attributes, capabilities or features described below or in the subsequent sections of this disclosure; provides information about one or more variable existing in a well bore, annulus or subterranean formation; provides such information during at least one among drilling, cementing, completion, stimulation and workover; provides such information without the transmission of signals to the target location; provides information about one or more geometric dimension, the location of a particular object or geometric feature, temperature, pressure, flow, chemical composition or in-situ stresses in an underground well, subterranean formation or hydrocarbon reservoir; can be used to improve well stimulation operations and well performance planning; provides information about the location of proppant disposed within a propped fracture or other area; provides multiple dimensions of an underground geometric feature; provides signal generating devices at one or more target location(s) to accomplish one or more of the above; uses signal generating devices that capture, generate or provide energy in-situ for transmitting one or more signals; incorporates nano-devices capable of generating energy and/or transmitting signals; uses piezoelectric signal generating devices; uses signal generating devices that include sound generating material capable of emitting detectable sound waves from a subterranean location; does not require the use of offset wells or radioactive materials; is reliable; is easy to implement; requires minimal retrofitting of existing equipment; is cost-effective.

BRIEF SUMMARY OF THE DISCLOSURE

In some embodiments, a method of obtaining information about at least one variable existing at a target location in an underground well bore and/or surrounding subterranean formation is utilized. These methods include delivering a plurality of signal generating devices to the target location. At least some of the signal generating devices transmit at least one signal. At least some of the signals are received and information about the variable(s) is generated therefrom. These methods do not require the transmission of signals to the target location in order to obtain or generate the information.

In various embodiments, a method of obtaining information about at least one variable existing at a target location in an underground well bore and/or surrounding subterranean formation involves delivering a plurality of nano-devices to the target location. At least some of the nano-devices generate or capture energy in-situ sufficient to power the transmission of at least one detectable signal. At least one detectable signal is transmitted from the target location. At least some of the transmitted signals emitted are received. Information about the variable(s) is derived from at least some of the received signals.

Some embodiments involve a method of obtaining information about at least one subterranean fracture or the location of proppant within the fracture. These embodiments include incorporating a plurality of signal generating devices in the proppant. Delivering the proppant to at least one fracture. At least some of the signal generating devices in the proppant generate a detectable signal in response to at least one down hole condition or property. At least one receiver receives at least one of the detectable signals. Information about the fracture or location of the proppant within the fracture is derived from at least one of the received signals.

Various embodiments include a method of hydraulic fracturing of a subterranean formation proximate to an underground hydrocarbon reservoir from a well bore. The method of these embodiments includes injecting fluid into the well bore at pressure that is higher than pressure in the reservoir. The injected fluids form fractures in the formation from the well bore and through which hydrocarbons may flow from the reservoir into the well bore. Proppant is prepared that includes a plurality of signal generating devices. The proppant is delivered into the fracture to increase the conductivity of the fracture and provide a flow path of hydrocarbons between the reservoir and the well bore. At least some of the signal generating devices in the proppant emit at least one detectable signal in response to at least one down hole condition or property. At least one of the transmitted signals is received and information about the propped fracture or proppant is derived therefrom.

Accordingly, the present disclosure includes features and advantages which are believed to enable it to advance underground information gathering technology. Characteristics and potential advantages of the present disclosure described above and additional potential features and benefits will be readily apparent to those skilled in the art upon consideration of the following detailed description of various embodiments.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
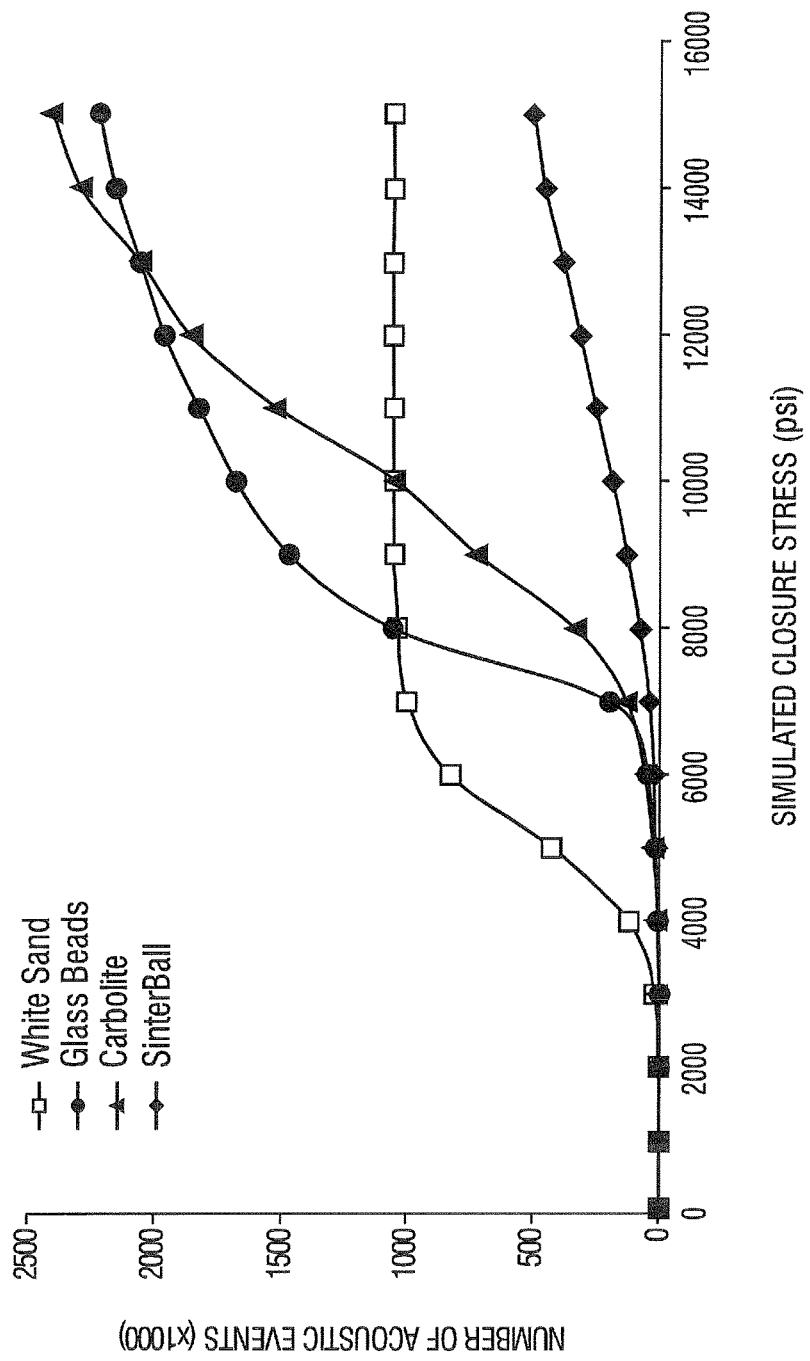
FIG. 1 is line graph illustrating acoustic emissions detected from the breaking of exemplary white sand proppant, glass beads, CarboLite® proppant and SinterBall Bauxite proppant during testing conducted to illustrate at least one embodiment of the present disclosure.

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent application, any patent granted hereon or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In accordance with an embodiment of the present disclosure, one or more signal generating devices are selectively provided into a well bore or subterranean formation. The signal generating devices may have any suitable form, construction, configuration and operation and may be deployed to the desired target location(s) in the well bore or subterranean formation in any suitable manner. For example, the signal generating devices may be in the form of beads, wires, pellets, spheres or other suitable items delivered in a fluid mixture or slurry with conventional fluid delivery equipment. When providing information about propped fractures and other geometric features, the signal generating devices may be used or transported in proppant and may have one or more physical property similar to the proppant (e.g. size, shape, density, specific gravity). As used herein, the term "proppant" includes any substance, composite or fluid-particle mixture useful for assisting in propping open a fracture, crack or other area in an underground earthen formation, or other desired purpose in a well bore or subterranean formation. If desired, the signal generating devices may be clustered or agglomerated together. In preferred embodiments, it is generally desirable that the individual signal generating devices or clusters thereof are not larger than the proppant particles.

In some embodiments, the signal generating devices may themselves be the proppant ("signal generating device proppant"). When signal generating device proppant is used along with non-signal generating device proppant, it may be desirable for the signal generating device proppant to have a similar particulate size and specific gravity as the other proppant to ensure homogenous distribution. If desired, the signal generating device proppant may be coated for strength or other qualities.

In other embodiments, the signal generating devices may be included in, or provided with, other primary proppant. For example, the signal generating devices may be separate components mixed into the proppant. For another example, the signal generating devices may be bonded to or formed into the proppant particles, such as by embedding the signal generating devices within a thermoplastic proppant material or coating the signal generating devices onto the outer surface of the proppant. For cost effectiveness, it may be desirable to include a minimal effective concentration of signal generating devices.

In some embodiments, the signal generating devices include nano-devices. As used herein, the term "nano-device" includes, without limitation, one or more nano-scale sized particles, materials, devices or composites capable of being used to generate energy and/or emit a detectable signal. If desired, each nano-scale sized particle, material, device or composite may be encased or contained within another particle. The nano-scale sized particles, materials, devices or composites possess at least one feature having a nano-scale dimension, such as pore diameter, platelet length, particle mean diameter, material thickness and the like, and may be functionalized or non-functionalized. In some embodiments, the nano-scale dimension may be less than 1000 nanometers; 500 nanometers; in some embodiments, less than 200 nanometers; in some embodiments, less than 150 nanometers; in some embodiments, less than 100 nanometers; in some embodiments, less than 70 nanometers; in some embodiments, less than 50 nanometers; in some embodiments, less than 20 nanometers; in some embodiments, less than 10 nanometers; in some embodiments, less than 5 nanometers; in some embodiments, less than 1 nanometer; in some embodiments, less than 0.5 nanometers; and so on. In some embodiments, the nano-scale dimension may vary among multiple nano-devices being used.

In some instances, nano-devices may be used as the nano-components of nano-composite filled particulate proppant. In one particular embodiment, the nano-devices could be formed into deformable ULW (ultra-lightweight) proppant, such as LiteProp™ 108 offered by Baker Hughes Incorporated, the assignee of the present application. In this example, the nano-devices could either be used in place of a portion of the other nano-particles formed into the LiteProp™ 108 proppant, or added thereto.

After being deployed, the signal generating devices are useful to provide one or more detectable signal that can be received and processed in any suitable manner. In some embodiments, the signal generating devices may include power generating, transmitting or sensing capabilities, or a combination thereof. For example, each signal generating devices may be capable of generating or capturing power in-situ sufficient for the transmission of one or more detectable signal (e.g. sound waves, vibrations, radio waves of a suitable frequency). In some embodiments, the signal generating devices may generate power from or react to thermal energy or bottom hole static temperature (BHST), fluid absorption (e.g. water absorption completing circuit), particle swelling, changes in temperature, mechanical stress or pressure, or other down hole properties or conditions. In various embodiments, the signal generating devices may include one or more micro-battery for providing energy.

In some embodiments, the signal generating devices may themselves emit the signal(s). In other embodiments, the power generated by the signal generating devices may be used to actuate one or more transmitters to emit the detectable signal. When included, the transmitters may have any suitable form, configuration and operation. For example, appropriate radio wave micro-transmitters may be included in the signal generating devices, associated with or in communication with the signal generating devices or otherwise disposed sufficiently proximate to the signal generating devices to be actuated by the power provided thereby.

If desired, the signal generating devices, such as nano-devices, may include piezoelectric material(s) useful for generating power. Under the theory of direct piezoelectric effect, the piezoelectric material (e.g. certain crystals, polymers, ceramics, bone, enamel, wood, combinations thereof, etc.) is capable of generating an electric potential in response to applied mechanical stresses. If the material is not short-circuited, the applied charge induces voltage across the material. Thus, piezoelectric signal generating devices can be useful to produce electricity in response to the application of stress thereto. Accordingly, in some embodiments, piezoelectric signal generating devices may be deployed in a subterranean formation, such as in a hydraulic fracture, and activated (to generate electricity) by imposed stress on the devices caused by formation movement, such as fracture closure. The closure stress of the fracture may thus be used by the signal generating devices to create electric power.

In other embodiments, piezoelectric signal generating devices may be useful for creating motion when an electric field is applied to it. Under the theory of reverse piezoelectric effect, stress or strain is produced by the piezoelectric material upon the application of an electric field. Accordingly, after these piezoelectric signal generating devices are deployed to the desired location, an electric field may be applied to the signal generating devices. Some methods for applying an electrical field in an underground location are disclosed in U.S. patent application Ser. No. 12/421,061, filed on Apr. 9, 2009, entitled "Electrolocation Apparatus & Methods for Mapping from a Subterranean Well", having a common assignee with the present application and which is incorporated by reference herein in its entirety. However, the present disclosure is not limited to the details, techniques or applications disclosed in the above reference. The resulting motion (e.g. vibration) caused by the signal generating devices may be the detectable signal, or used to generate a detectable signal.

In some embodiments, the signal generating devices may include sound generating material. The sound generating material may, for example, be capable of emitting detectable sound waves in response to one or more down hole property or condition, such as those described above. In preferred embodiments, the sound generating material includes glass bubbles, or glass or ceramic beads, (or an agglomeration thereof), which will break when subject to one more down hole property or condition. The breaking of these materials will generate sound waves that are detectable, such as with the use of receivers (e.g. micro-seismic) as described further below. As used herein, the term "break" and variations thereof means at least one among crack, fail, fracture, collapse, expand, deform, separate, detach or shatter sufficient, depending upon the circumstances, to generate detectable sound in response to a down hole property or condition.

For example, glass or ceramic beads, as well as glass bubbles, will break under certain imposed stress caused by formation movement, such as fracture closure, sufficient to generate detectable sound emissions. In some applications, the glass or ceramic beads may sufficiently break under point-to-point stress of 7,000-9,000 psi applied thereto. For another example, glass bubbles may break, such as by expanding and shattering, due to a temperature change in the subterranean formation. In yet another example, glass bubbles may collapse due to a change in hydrostatic pressure.

The sound generating materials are not limited to the glass or ceramic beads or glass bubbles, but may be constructed of any other suitable material or combination of materials, such as certain plastics, metal alloys and other suitably brittle material, capable of sufficiently breaking and generating detectable sound in response to one or more down hole property or condition. Likewise, the sound generating materials may have any other suitable geometry and configuration, such as pellet or rods, that is capable of breaking and generating detectable sound in response to one or more down hole property or condition.

In the preferred embodiment, the sound generating materials are strong enough to avoid breaking during pumping, delivery and migration in the subterranean formation, possess particle size, particle density and transportability properties that are substantially the same as the proppant within which they are carried, and are mixed into the proppant in a sufficient volume to provide the desired sound wave transmission(s). For example, in some applications, the glass beads may be provided at 5% by weight of the proppant particles.

The signal(s) generated through use of the signal generating devices may be detectable in any suitable manner. For example, signals powered by the signal generating devices may be received by appropriate receivers disposed in the well, one or more offset wells, at the surface or other locations, or a combination thereof. If desired, receivers used in conventional micro-seismic monitoring may be used. In some embodiments, the receiver(s) may be disposed in the casing (e.g. cement, casing collar) or other component mounted in the well bore, carried on a coiled or other tubing, drill string, wireline, down hole tool or other component deployed in the well bore, or a combination thereof. In some instances, multiple receivers at different locations may be useful, such as to triangulate the source of the transmitted signals to determine location, dimensions or other variables.

If desired, systems and/or techniques of the present disclosure may be used in gathering information about variables in the well bore or subterranean formation along multiple intervals or angles in the well bore. In some applications, the same receivers may be used for receiving signals from transmitters at different locations, while in other applications, multiple sets of receivers at different locations may be warranted. For example, if the receivers are lowered into the well bore on a wireline or other carrier, the multiple sets of receivers may be disposed on the same wireline or other carrier at spaced intervals. Likewise, multiple sets of receivers may be embedded in, or connected with, the casing (not shown) or other fixture in the well bore at desired intervals to receive signals from transmitters at different target locations.

After signals are received, any methods suitable for processing them and ultimately deducing or providing the desired location, dimensions, geometry, spatial relationships or other down hole variables may be used. For example, data conversion/processing software may be used to convert transmitted radio signals into useful information. Mathematical modeling techniques, as are and become further known, may be used to formulate and apply appropriate algorithms via one or more computing device to determine the relationship between signals received and the desired variable information.

In applications where the variable includes determining one or more subterranean geometric dimension, the signals from multiple signal generating devices may be processed to determine the locations thereof. For example, the signals may be mapped in a process similar to other known micro-seismic mapping techniques. When the signal generating devices are used in proppant distributed throughout a propped fracture area, for example, such information may be used to characterize the azimuthal orientation, geometric dimensions (e.g. length, width, height, depth), underground location of all or part of the proppant pack or propped fracture area or a combination thereof. In some applications, if sufficient signal generating devices are deployed and transmissions are received, the width of the fracture may be determined. However, the present disclosure is not limited to determining the location and dimensions of hydraulic fractures. Some examples of other subterranean features that may be measured or mapped in various applications are naturally occurring fractures, wormholes or channels created by matrix stimulation and the like. If desired, other translocation technologies, such as signal reflectance and electrical resistance may be used in conjunction with apparatus, systems and/or methods of the present disclosure.

Examples

The following examples illustrate that sample sound generating material in the form of exemplary glass beads and ceramic proppant will emit detectable sound upon breakage due to the application thereto of point-to-point mechanical stress of the same general magnitude expected in certain hydraulic fracturing operations. As such, the examples illustrate the practice of one or more embodiment of the present invention. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

A modified API/ISO proppant crush test (API RP19C and ISO 13503-2) was set up to demonstrate and measure the acoustic behavior of various materials during stress application. The testing used a standard ISO crush cell having a 2" diameter piston and a MTS load frame hydraulic press (500 kpsi load capacity) with data acquisition unit. An acoustic transducer, with gel couplant applied, was mounted to the plate of the load frame and connected to an HP Universal counter and a Textronix oscilloscope. The counter was set up to monitor the total number of acoustic events (counts) and the oscilloscope displayed waveform and amplitude (loudness). A tripod-mounted digital camera was used to generate screen captures from the oscilloscope in order to document sample acoustic events.

Tests were conducted on the following materials:
40 g Ottawa white sand proppant at 20/40 mesh having an average specific gravity (ASG) of 2.65
(ii) 40 g borosilicate glass beads at 20/40 mesh having an ASG of 2.65
(iii) 40 g CarboLite® (ceramic) proppant (Carb.) (sold by CARBO Ceramics, Inc.) at 20/40 mesh having an ASG 2.70
(iv) 40 g SinterBall Bauxite proppant (sold by Sintex Minerals & Service, Inc.) at 20/40 mesh having an ASG of 3.60
(v) 53 g (95%) SinterBall Bauxite proppant and 3 g (5%) glass beads
(vi) 16 g LiteProp™ 108 (plastic) proppant (LP 108) at 14/40 mesh having an ASG 1.05
(vii) 15 g (95%) LiteProp™ 108 proppant and 1 g CarboLite® proppant Test results were obtained for (i)-(vii) above at loads applied to the piston of the filled crush cell from 100 psi-15,000 psi at a rate of 2,000 psi/minute to simulate potential subterranean fracture closing stresses. The pressure on the cell was held at 15,000 psi for 2 minutes before being unloaded to 0 psi over 2 minutes. The number of acoustic events was measured at each 1,000 psi mark and shown in Table 1. Neither the counter nor the oscilloscope were calibrated to detect specific acoustic events from specific materials, thus easily detecting all acoustic emissions in each run. The detection levels were left the same for all tests, allowing for a direct comparison between the different materials tested.

Figure 2:
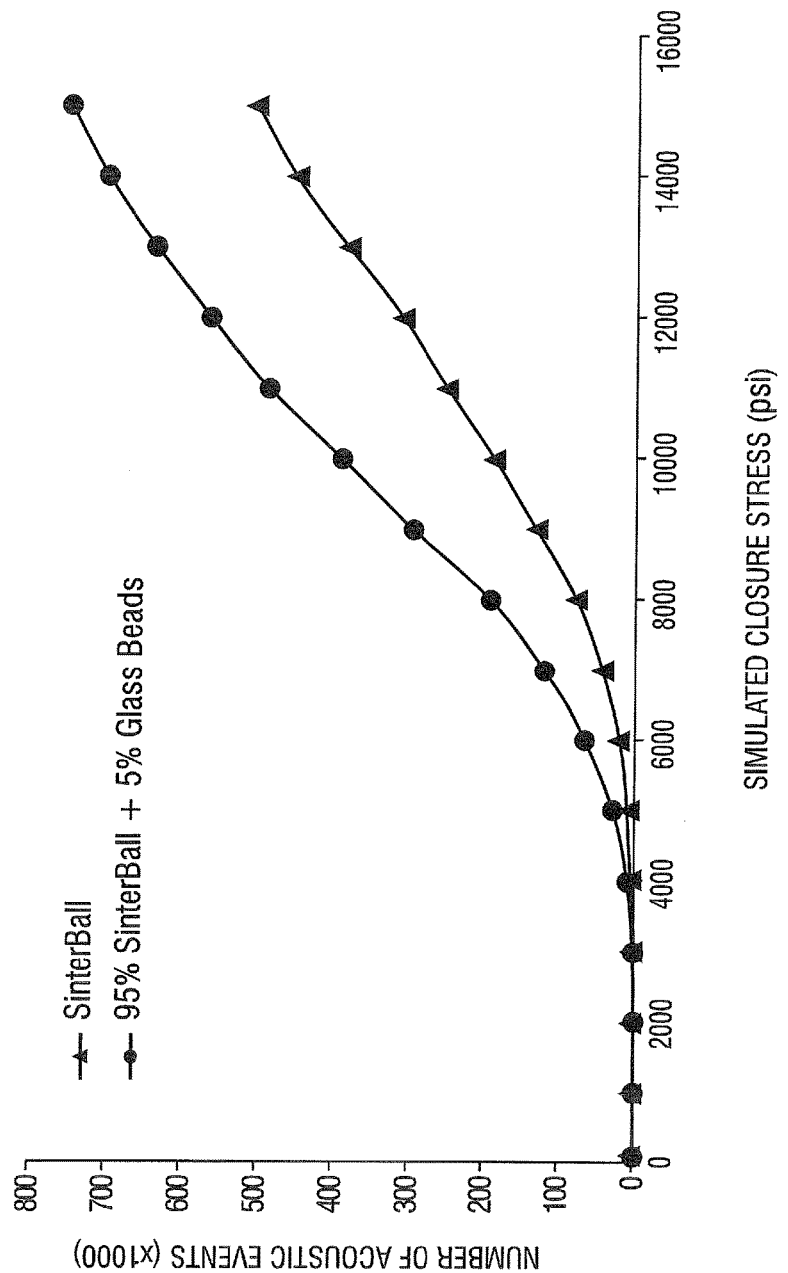
FIG. 2 is line graph comparing the acoustic emissions detected from the breaking of SinterBall Bauxite proppant and a mixture of SinterBall Bauxite proppant and glass beads during testing conducted to illustrate at least one embodiment of the present disclosure.
Figure 3:
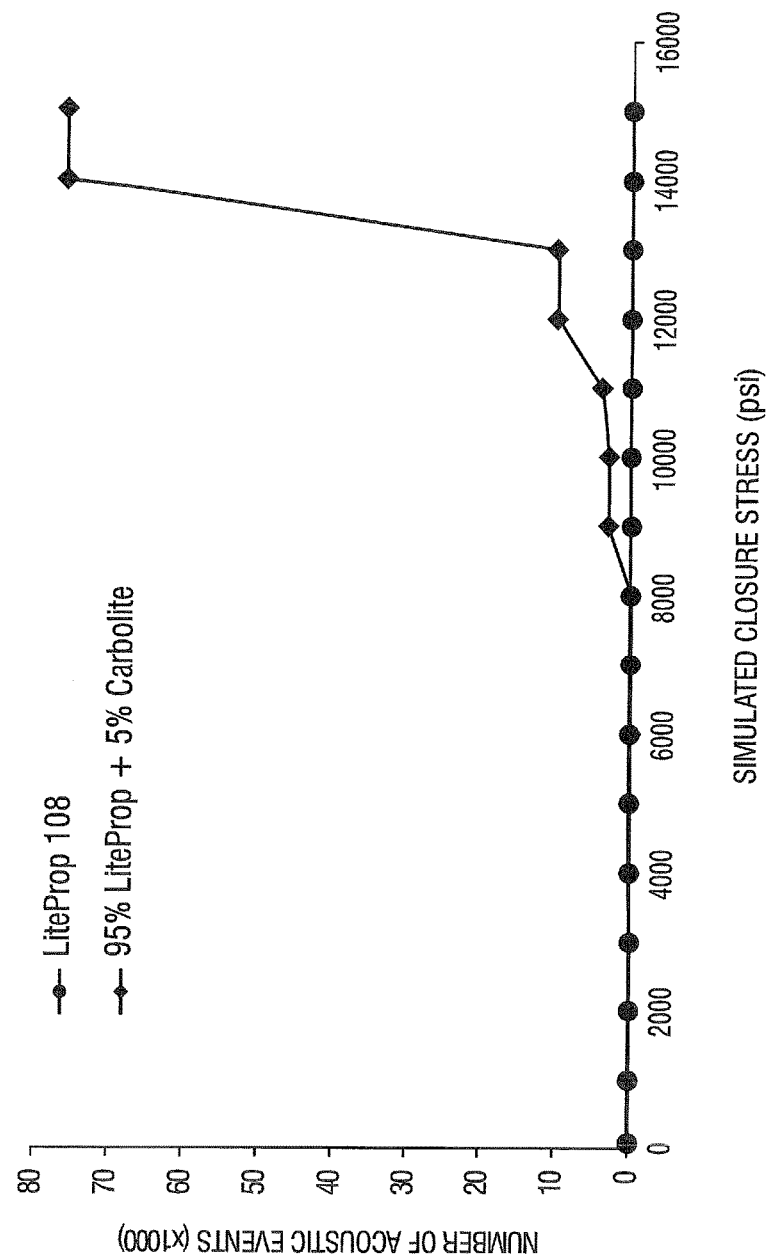
FIG. 3 is line graph comparing the acoustic emissions detected from the breaking of LiteProp™ 108 proppant and a mixture of LiteProp 108 and CarboLite proppants during testing conducted to illustrate at least one embodiment of the present disclosure.

In FIGS. 1-3, the number of acoustic events shown for each test run in Table 1 is graphed over the duration of the tests as the applied pressure was increased. As shown in FIG. 1, the glass beads showed a most dramatic increase in counts at 7,000 psi at a magnitude of acoustic events believed to provide sufficient sound emissions to be detectable in the down hole environment. The ceramic (CarboLite®) proppant also showed a significant, though more gradual, increase around the 8,000 psi levels at count levels believed to provide detectable sound emissions. These pressures reflect typical fracture closing stresses, indicating that the glass beads and CarboLite proppant will break at the desired pressures. By comparison, the white sand and SinterBall proppants demonstrated quantities of acoustic events less likely to be detectable during typical fracture closing events.

FIG. 2 illustrates that the inclusion of 5% glass beads in a SinterBall proppant mixture provided increases in acoustic events at significant multiples. Likewise, FIG. 3 shows that the inclusion of 5% CarboLite in a LiteProp 108 proppant mixture dramatically increased the number of acoustic events.

Figure 4:
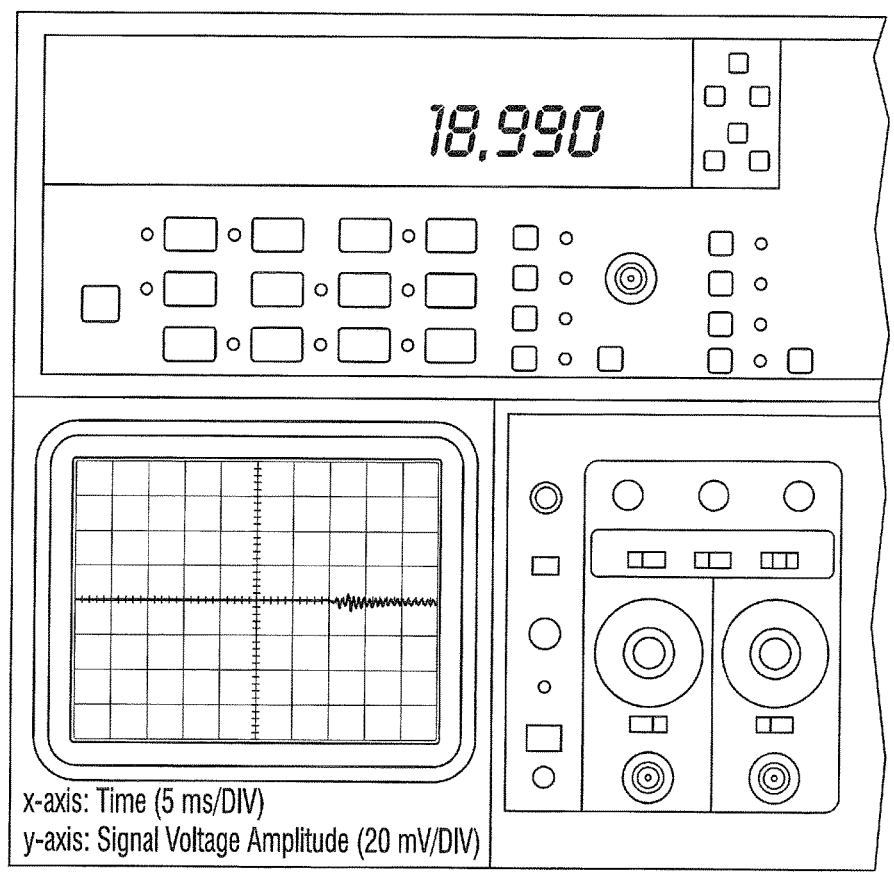
FIG. 4 is a photograph of a screen capture of an oscilloscope taken during testing of SinterBall proppant conducted to illustrate at least one embodiment of the present disclosure.
Figure 5:
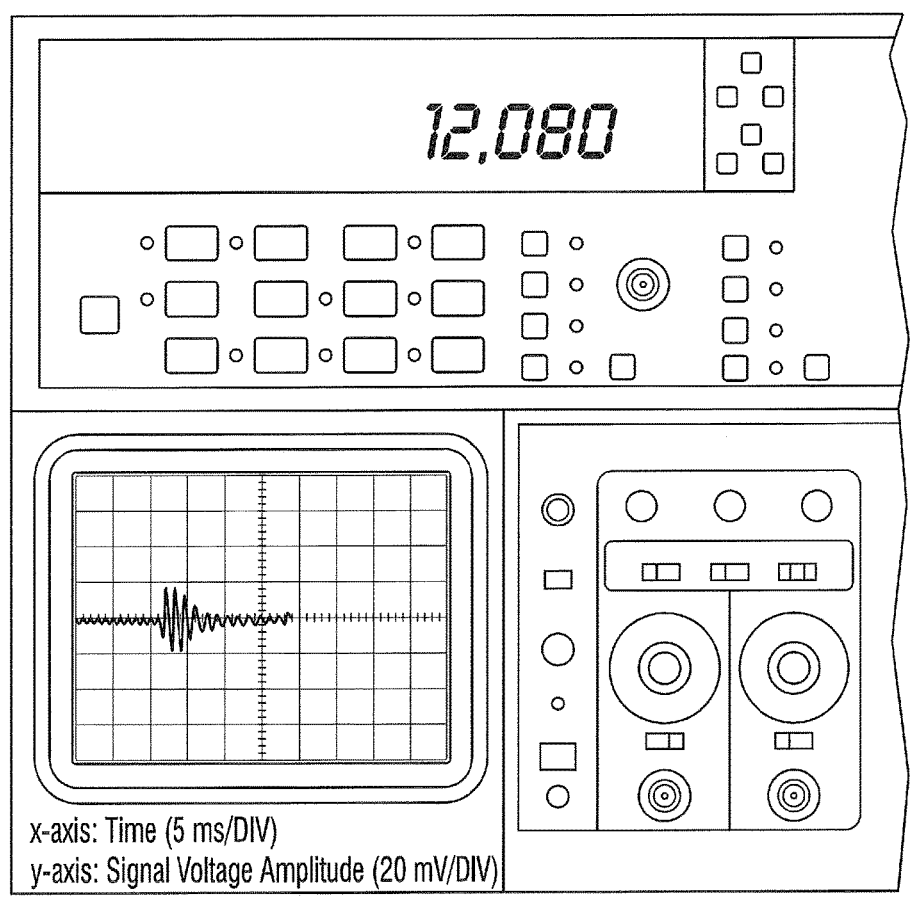
FIG. 5 is a photograph of a screen capture of an oscilloscope taken during testing of white sand proppant conducted to illustrate at least one embodiment of the present disclosure.
Figure 6:
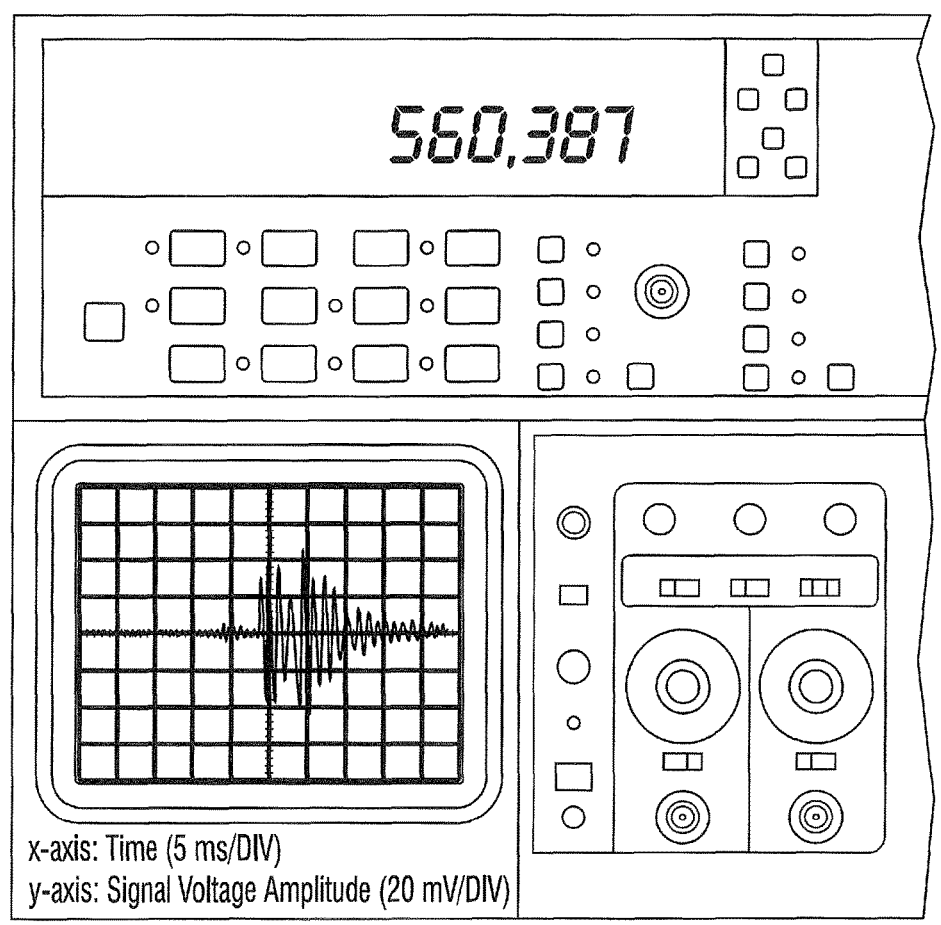
FIG. 6 is a photograph of a screen capture of an oscilloscope taken during testing of CarboLite proppant conducted to illustrate at least one embodiment of the present disclosure.

FIGS. 4-6 are sample screen captures of the oscilloscope during testing and illustrate sound waveforms (loudness) caused by breakage of the tested materials. The x axis represent testing time, while the y axis reflect amplitude of detected acoustic events. FIG. 4 is a screen shot taken during the SinterBall test run, indicating consistently quiet sound emissions and a quantity of acoustic events (breakage) believed to be insufficient to crease sufficiently detectable sound in a typical down hole environment. FIG. 5 illustrates that the breaking of the white sand proppant was substantially louder, and FIG. 6 reflects significant amplitudes of sound detected during breakage of the CarboLite. FIGS. 5 and 6 also illustrate that the amplitude of sound emissions during these test runs was greatest when the number of counts of the tested materials substantially increased, and then decreased after the number of counts reached a plateau. This data supports a finding that the CarboLite and glass beads (which showed a more dramatic increase in counts) could be ideal sound generating materials when their peak breaking pressures align with expected fracture closing stresses or other down hole events.

The percentage of crushed fines was measured through a 40 mesh screen for each run after testing. As shown in Table 1, there was significant reduction in size of the tested mass of glass beads and CarboLite proppant (as well as the white sand proppant), indicating they are susceptible to effective breakage at typical fracture closing pressures. Accordingly, the test results indicate that the certain materials, such as glass beads and ceramic proppant, will sufficiently break under applied pressures equivalent to expected subterranean fracture closing stresses and emit sound at amplitudes believed to be detectable by currently available microseismic receivers. Such materials may thus be effectively employed as sound generating materials in accordance with the present disclosure.

TABLE 1

| | | NUMBER OF RECORDED ACOUSTIC EVENTS/1000 | | | | | NUMBER OF ACOUSTIC EVENTS | |
| --- | --- | --- | --- | --- | --- | --- | --- | --- |
| TIME Min. | Pressure psi | White Sand | Glass Beads | CarboLite | Sinter Ball | 95% SB + 5% Glass | LP 108 | 95% LP108 + 5% Carb. |
| 0.0 | 100 | 0.000 | 0.000 | 0.000 | 0.000 | 0.000 | 0 | 0 |
| 0.5 | 1000 | 0.010 | 0.110 | 0.000 | 0.000 | 0.000 | 0 | 0 |
| 1.0 | 2000 | 0.750 | 0.203 | 0.080 | 0.005 | 0.252 | 0 | 0 |
| 1.5 | 3000 | 17.000 | 1.222 | 0.700 | 0.141 | 1.560 | 0 | 0 |
| 2.0 | 4000 | 116.000 | 6.320 | 5.800 | 2.898 | 8.600 | 0 | 0 |
| 2.5 | 5000 | 425.000 | 17.546 | 21.900 | 8.787 | 28.200 | 0 | 0 |
| 3.0 | 6000 | 830.000 | 46.858 | 58.000 | 20.168 | 65.000 | 0 | 0 |
| 3.5 | 7000 | 1000.000 | 192.000 | 129.000 | 41.000 | 118.000 | 0 | 0 |
| 4.0 | 8000 | 1037.000 | 1060.000 | 330.000 | 77.000 | 191.000 | 0 | 0 |
| 4.5 | 9000 | 1052.000 | 1475.000 | 725.000 | 129.000 | 295.000 | 0 | 3 |
| 5.0 | 10000 | 1055.000 | 1688.000 | 1050.000 | 185.000 | 390.000 | 0 | 3 |
| 5.5 | 11000 | 1056.251 | 1832.000 | 1530.000 | 249.000 | 488.000 | 0 | 4 |
| 6.0 | 12000 | 1057.155 | 1965.000 | 1860.000 | 310.000 | 563.000 | 0 | 10 |
| 6.5 | 13000 | 1057.789 | 2060.000 | 2060.000 | 383.000 | 636.000 | 0 | 10 |
| 7.0 | 14000 | 1058.430 | 2160.000 | 2299.000 | 453.000 | 699.000 | 0 | 76 |
| 7.5 | 15000 | 1058.803 | 2223.000 | 2414.000 | 505.000 | 748.000 | 0 | 76 |
| 8.0 | 15000 | 1058.815 | 2246.000 | 2430.000 | | 766.729 | 0 | 76 |
| 8.5 | 15000 | 1058.840 | | 2443.000 | 530.000 | 772.304 | 0 | 76 |
| 9.0 | 15000 | 1058.933 | 2259.000 | 2463.000 | 534.621 | 775.756 | 0 | 76 |

TABLE 1-continued

|  |  | NUMBER OF RECORDED ACOUSTIC EVENTS/1000 | | | | | NUMBER OF ACOUSTIC EVENTS | |
| --- | --- | --- | --- | --- | --- | --- | --- | --- |
| TIME Min. | Pressure psi | White Sand | Glass Beads | CarboLite | Sinter Ball | 95% SB + 5% Glass | LP 108 | 95% LP108 + 5% Carb. |
| 9.5 | 15000 | 1058.933 | 2263.189 | 2469.275 | 536.829 | 777.848 | 0 | 76 |
| 11.5 | 0 | 1058.933 | 2263.754 | 2469.474 | 537.011 | 778.021 | 0 | 76 |
| Crushed Fines (%) |  | 53.5 | 41.1 | 32.4 | 6.3 | 11.9 | n/a | n/a |

Preferred embodiments of the present disclosure thus offer advantages over the prior art and are well adapted to carry out one or more of the objects of this disclosure. However, the present invention does not require each of the components and acts described above and is in no way limited to the above-described embodiments, methods of operation, variables, values or value ranges. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that are provided in or apparent from the description above or claimed herein, and any other methods which may fall within the scope of the appended claims, may be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. A method of obtaining information about at least one fracture in a subterranean formation or the location of proppant within the fracture, the method comprising:
    forming a slurry that includes a plurality of particles of signal generating devices and particles of proppant, the particles of signal generating devices including sound generating material consisting of glass beads, ceramic beads, glass bubbles or an agglomeration thereof and further wherein the particles of sound generating material break under point-to-point stresses;
    injecting the slurry into a subterranean formation surrounding an underground well and delivering the slurry to the at least one fracture;
    cracking, expanding or shattering at least some of the particles of the sound generating material in response to fracture closure stress applied to the particles of the sound generating material to emit at least one detectable sound wave, wherein the at least one detectable sound wave is caused only by cracking, expanding or shattering of the particles of the sound generating material;
    receiving in at least one receiver at least one detectable sound wave caused by breakage of the sound generating material wherein the at least one receiver is located on the surface of the underground well or at another location; and
    deriving information about the fracture or location of the proppant within the fracture from the at least one received sound wave.

2. The method of claim 1, wherein the at least one receiver is disposed at the surface of the underground well.

3. The method of claim 1, wherein the at least one receiver is disposed at an offset well.

4. The method of claim 1, wherein the particle size of the signal generating devices is substantially the same as the particle size of the proppant.

5. The method of claim 1, wherein the particles of the signal generating devices are not larger than the particles of the proppant.

6. The method of claim 1, wherein the particles of the signal generating devices have substantially the same specific gravity as the particles of the proppant.

7. The method of claim 1, wherein the at least one receiver consists of receivers at different locations and further wherein the receivers triangulate the source of the signals transmitted from the signal generating devices.

8. A method of obtaining information about at least one fracture in a subterranean formation or the location of proppant within the fracture, the method comprising:
    forming a slurry comprising a plurality of particles of proppant and a plurality of particles of sound generating material, wherein the particles of sound generating material are not larger than the particles of the proppant and further wherein the sound generating material cracks or shatters in response to fracture closure stresses;
    injecting the slurry into an underground well surrounding the subterranean formation and delivering the slurry to the at least one fracture;
    delivering the proppant to the at least one fracture;
    generating a detectable sound wave by cracking or shattering at least some of the sound generating material in response to fracture closure stress applied thereto;
    receiving at least one detectable signal from the generated sound wave with at least one receiver disposed on a surface of an underground well or an offset well; and
    deriving information about the fracture or location of the proppant within the fracture from the at least one received signal.

9. The method of claim 8, wherein the sound generating material comprises glass beads, ceramic beads, glass bubbles, metal alloys or plastic.

10. The method of claim 8, wherein the sound generating materials include a piezoelectric material.

11. The method of claim 10, wherein the piezoelectric material comprises ceramic, bone, enamel or wood or a combination thereof.

12. A method of obtaining information about at least one fracture in a subterranean formation wherein the at least one fracture is created during hydraulic fracturing of a gas or oil well, the method comprising:

injecting fluid into the well and forming at least one fracture in the subterranean formation wherein the fluid comprises (i) particles of proppant and (ii) particles of sound generating material, wherein the particles of sound generating material generate power from or react to thermal energy or bottom hole static temperature, particle swelling or temperature changes sufficient to power the transmission of at least one detectable signal of a sound wave emitted from the particles of sound generating material;

emitting a detectable sound wave from the particles of sound generating material in response to a downhole condition; and detecting the sound wave with at least one receiver on the surface of the well, one or more offset wells, in the casing of a well, on a tubing in a well, on a wireline or a downhole tool or another location.

13. The method of claim 12, wherein the at least one receiver is at an offset well.

14. The method of claim 12, wherein the particles of sound generating material include piezoelectric material.

15. The method of claim 14, wherein the piezoelectric material comprises ceramics, bone, enamel or wood or a combination thereof.

16. The method of claim 12, wherein the particles of the sound generating material comprise glass beads, ceramic beads, glass bubbles, metal alloys or plastic.

17. The method of claim 12, wherein the at least one receiver consists of multiple receivers and wherein the multiple receivers are located at different locations and further wherein the multiple receivers triangulate the source of the at least one detectable emitted sound wave.

\* \* \* \* \*